(12) United States Patent
Huang et al.

(10) Patent No.: US 12,345,272 B2
(45) Date of Patent: Jul. 1, 2025

(54) CEILING FAN AND STRUCTURE THEREOF

(71) Applicant: HOTECK INC., Taichung (TW)

(72) Inventors: Wen-Hai Huang, Taichung (TW);
Chia-Wei Chang, Taichung (TW);
Min-Yuan Hsiao, Taichung (TW)

(73) Assignee: HOTECK INC., Taichung (TW)

( * ) Notice: Subject to any disclaimer, the term of this patent is extended or adjusted under 35 U.S.C. 154(b) by 206 days.

(21) Appl. No.: 18/322,553

(22) Filed: May 23, 2023

(65) Prior Publication Data
US 2024/0141916 A1  May 2, 2024

(30) Foreign Application Priority Data

Oct. 31, 2022  (TW) .................................. 111211873

(51) Int. Cl.
*F04D 29/34* (2006.01)
*F04D 25/06* (2006.01)
*F04D 29/32* (2006.01)

(52) U.S. Cl.
CPC ............. *F04D 29/34* (2013.01); *F04D 25/06* (2013.01); *F04D 29/325* (2013.01)

(58) Field of Classification Search
CPC ......... F04D 29/34; F04D 25/06; F04D 29/325
USPC .................................................... 417/423.1
See application file for complete search history.

(56) References Cited

U.S. PATENT DOCUMENTS

| | | | | |
|---|---|---|---|---|
| 5,597,290 A * | 1/1997 | Vipond | ................... | F04D 29/34 416/204 R |
| 6,769,883 B2 * | 8/2004 | Brid | ...................... | F04D 25/082 417/423.1 |
| 6,872,053 B2 * | 3/2005 | Bucher | ................. | F04D 25/088 403/302 |
| 8,579,588 B1 * | 11/2013 | Boyd | .................... | F04D 29/646 416/204 R |
| 2004/0009064 A1 * | 1/2004 | Young | ..................... | F04D 29/34 416/5 |
| 2009/0004007 A1 * | 1/2009 | Sakai | ..................... | F04D 29/662 416/223 R |
| 2010/0129225 A1 * | 5/2010 | Itou | ....................... | F04D 29/023 416/204 R |
| 2015/0086375 A1 * | 3/2015 | Kuramochi | ........... | F04D 25/088 416/220 R |
| 2016/0069352 A1 * | 3/2016 | Kreidler | ................ | F04D 29/263 29/598 |

(Continued)

*Primary Examiner* — Logan M Kraft
*Assistant Examiner* — John D Bailey
(74) *Attorney, Agent, or Firm* — Li & Cai Intellectual Property Office

(57) ABSTRACT

A ceiling fan and a structure thereof are provided. The structure includes a blade holder, a plurality of blades, and a plurality of positioning elements. The blade holder includes a holder body and a plurality of support platforms. The holder body has a plurality of first matching structures spaced apart from each other. Each of the support platforms includes a first positioning structure. Each of the blades has a second matching structure and a second positioning structure. The second matching structures can be guided by the first matching structures, so that each of the blades is disposed at an installation position on one of the support platforms along an oblique track. When each of the blades is located at the installation position, the first positioning structures and the second positioning structures abut against each other.

8 Claims, 12 Drawing Sheets

(56) References Cited

U.S. PATENT DOCUMENTS

| | | | | |
|---|---|---|---|---|
| 2016/0290357 A1* | 10/2016 | Whitley | ............... | F04D 19/002 |
| 2016/0327055 A1* | 11/2016 | Roche | ................. | F01D 5/3007 |
| 2017/0037869 A1* | 2/2017 | Zauhar | ................ | F04D 25/088 |
| 2017/0218962 A1* | 8/2017 | Yamamoto | ........... | F04D 25/088 |
| 2020/0063746 A1* | 2/2020 | Botkin | ................... | F04D 29/34 |
| 2022/0290681 A1* | 9/2022 | Yamashita | ........... | F04D 27/008 |
| 2023/0094150 A1* | 3/2023 | Gallina | ............... | F04D 29/384 |
| | | | | 416/205 |
| 2023/0235749 A1* | 7/2023 | Yao | ........................ | F04D 29/34 |
| | | | | 416/244 R |

* cited by examiner

CEILING FAN AND STRUCTURE THEREOF

CROSS-REFERENCE TO RELATED PATENT APPLICATION

This application claims the benefit of priority to Taiwan Patent Application No. 111211873, filed on Oct. 31, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a device, and more particularly to a ceiling fan and a structure thereof that can be quickly assembled.

BACKGROUND OF THE DISCLOSURE

A conventional ceiling fan includes a seat, a motor disposed on the seat, a blade holder connected to the motor, and a plurality of blades that are fixed onto the blade holder. When the conventional ceiling fan is being assembled, two operators are needed to perform a high-altitude operation, in which one of the two operators supports the blades that are not yet fixed, and the other one uses a fixing tool to fix the blades. However, such an assembly method is not only time-consuming but also prone to construction accidents due to the lack of tacit understanding between the two operators.

SUMMARY OF THE DISCLOSURE

In response to the above-referenced technical inadequacies, the present disclosure provides a ceiling fan and a structure thereof.

In order to solve the above-mentioned problems, one of the technical aspects adopted by the present disclosure is to provide a ceiling fan. The ceiling fan includes a seat, a motor, a blade holder, a plurality of blades, and a plurality of positioning elements. The seat is configured to be set on a ceiling. The motor is disposed on the seat. The blade holder is connected to the motor. The blade holder includes a holder body and a plurality of support platforms. The holder body has a plurality of first matching structures spaced apart from each other. The support platforms are connected to the holder body. The support platforms respectively correspond in position to the first matching structures, and each of the support platforms includes a first positioning structure. Each of the blades has a second matching structure and a second positioning structure. The second matching structures of the blades are configured to respectively cooperate with the first matching structures, so that each of the blades is disposed at an installation position on one of the support platforms along an oblique track. When each of the blades is located at the installation position, the first positioning structures and the second positioning structures abut against each other. Each of the positioning elements is disposed on one of the first positioning structures and one of the second positioning structures that correspond in position to each other.

In order to solve the above-mentioned problems, another one of the technical aspects adopted by the present disclosure is to provide a structure of ceiling fan. The structure includes a blade holder, a plurality of blades, and a plurality of positioning elements. The blade holder includes a holder body and a plurality of support platforms. The holder body has a plurality of first matching structures spaced apart from each other. The support platforms are connected to the holder body. The support platforms respectively correspond in position to the first matching structures, and each of the support platforms includes a first positioning structure. Each of the blades has a second matching structure and a second positioning structure. The second matching structures of the blades are configured to be respectively guided by the first matching structures, so that each of the blades is disposed at an installation position on one of the support platforms along an oblique track. When each of the blades is located at the installation position, the first positioning structures and the second positioning structures abut against each other. Each of the positioning elements is disposed on one of the first positioning structures and one of the second positioning structures that correspond in position to each other.

Therefore, in the ceiling fan and the structure thereof provided by the present disclosure, by virtue of "the second matching structures of the blades being configured to respectively cooperate with the first matching structures, so that each of the blades is disposed at an installation position on one of the support platforms along an oblique track" and "the first positioning structures and the second positioning structures abutting against each other when each of the blades is located at the installation position," the ceiling fan and the structure can achieve an effect of quick assembly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
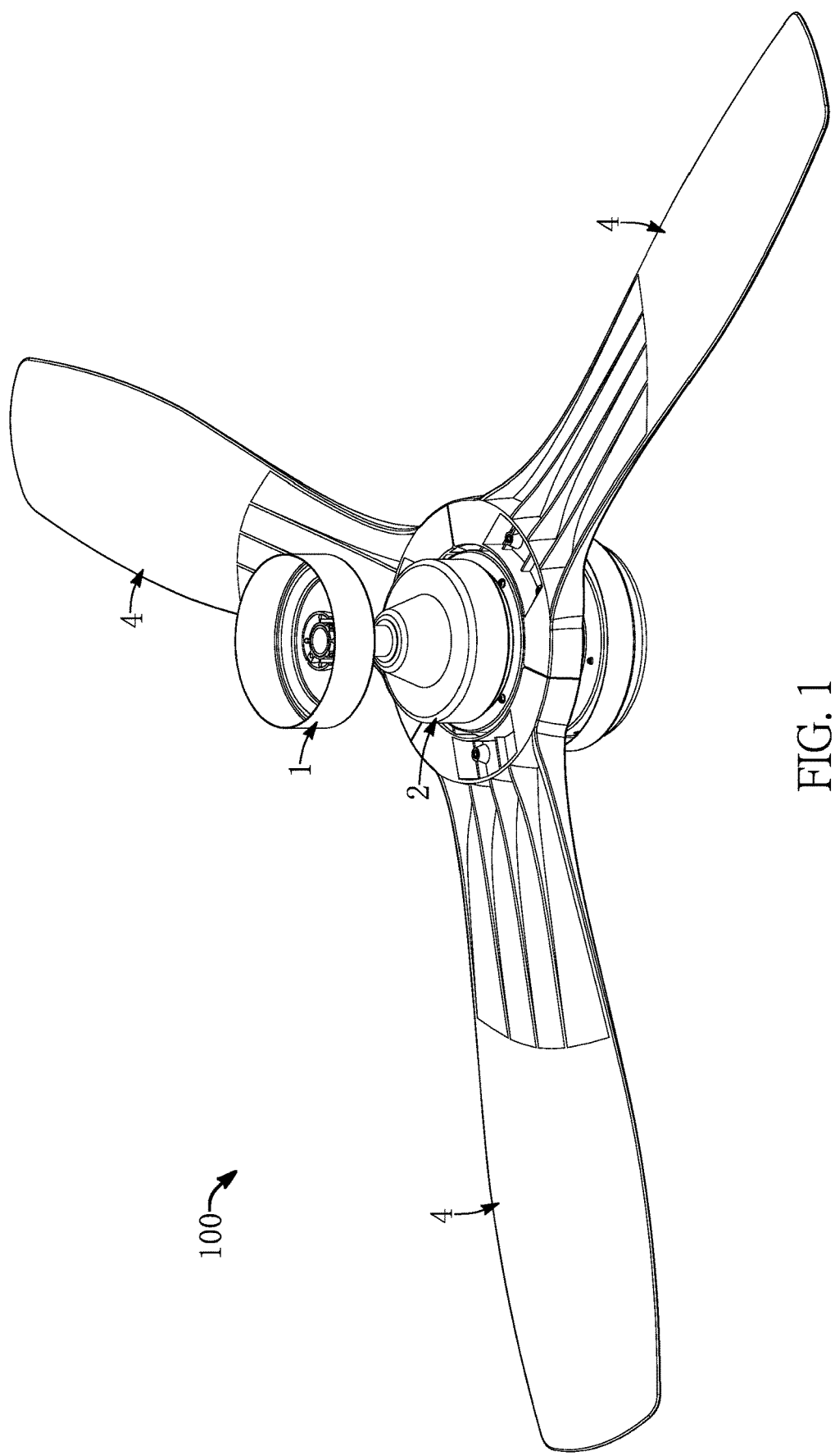
FIG. 1 is a schematic perspective view of a ceiling fan according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In the following description, if it is indicated that "reference is made to a specific figure" or "as shown in a specific figure", this is only to emphasize that in the description that follows, most content related thereto is depicted in said specific figure. However, the description that follows should not be construed as being limited to said specific figure only.

Figure 2:
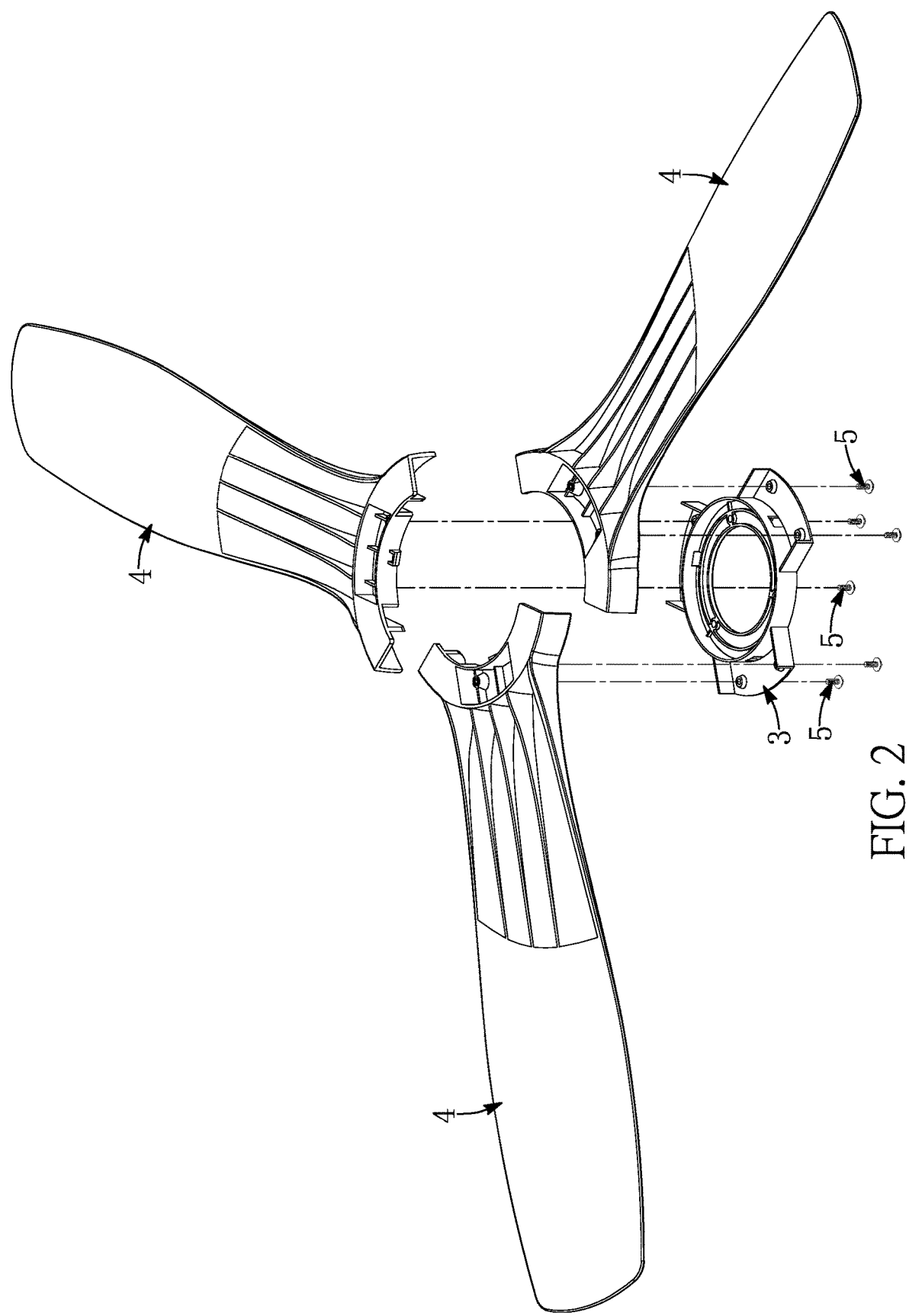
FIG. 2 is a partial schematic exploded view of the ceiling fan according to the present disclosure.

Referring to FIG. 1 to FIG. 12, the present disclosure provides a ceiling fan 100. As shown in FIG. 1 and FIG. 2, the ceiling fan 100 includes a seat 1, a motor 2 disposed on the seat 1, a blade holder 3 connected to the motor 2, a plurality of blades 4 disposed on the blade holder 3, and a plurality of positioning elements 5 that are used for fixing the blades 4.

It should be noted that the seat 1, the motor 2, the blade holder 3, the blades 4, and the positioning elements 5 in the present embodiment are jointly defined as the ceiling fan 100, but the present disclosure is not limited thereto. For example, the blade holder 3, the blades 4, and the positioning elements 5 can be jointly defined as a structure of a ceiling fan, and can be independently used (e.g., implemented, manufactured, or sold) or can be used in cooperation with other components. The following description describes the structure and connection relationship of each component of the ceiling fan 100.

Referring to FIG. 1, the seat 1 is used to be set on a ceiling (not shown in the figures), and the seat 1 is used for the installation of the motor 2. The specific types of the seat 1 and the motor 2 can be adjusted according to practical requirements, so that the seat 1 and the motor 2 of the present disclosure are not limited to the structures shown in the figures.

Figure 3:
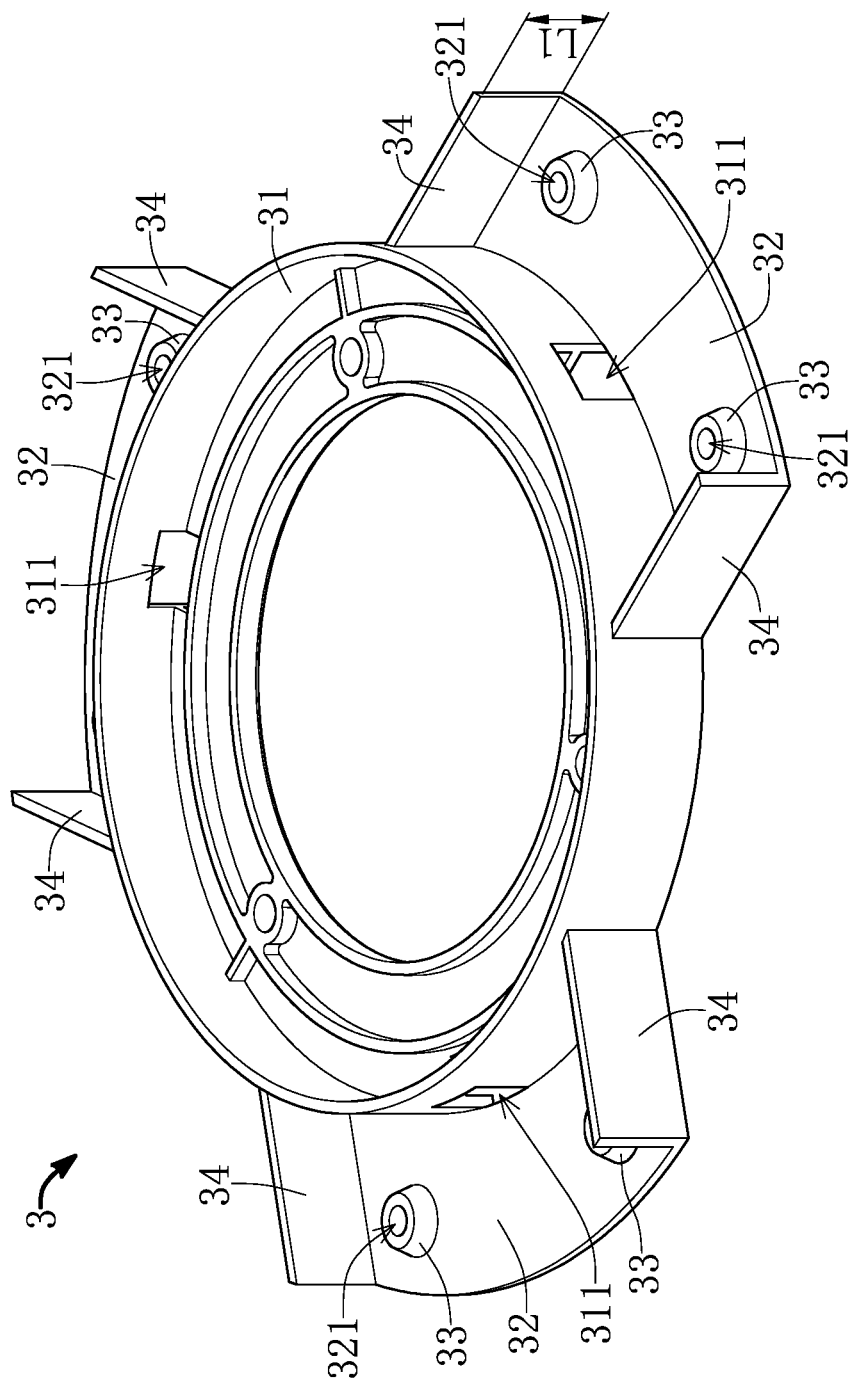
FIG. 3 is a schematic perspective view of a blade holder according to the present disclosure.

Referring to FIG. 2 and FIG. 3, the blade holder 3 in the present embodiment is a metal structure, and includes a holder body 31 and a plurality of support platforms 32 that are integrally connected thereto. Specifically, the holder body 31 is used to be fixed onto a rotating part of the motor 2, and the holder body 31 can be driven by the motor 2 to rotate relative to the seat 1. A side wall of the holder body 31 also has a plurality of first matching structures 311 that are spaced apart from each other, and the first matching structures 311 in the present embodiment are buckle grooves.

In addition, the support platforms 32 extend from the side wall of the holder body 31, and the support platforms 32 correspond in position to the first matching structures 311, respectively. In the present embodiment, each of the support platforms 32 corresponds in position to one of the first matching structures 311, but the present disclosure is not limited thereto. For example, in another embodiment of the present disclosure (not shown in figures), each of the support platforms 32 can correspond in position to two or more of the first matching structures 311. In addition, each of the support platforms 32 further includes a first positioning structure 321, and each of the first positioning structure 321 in the present embodiment is a through hole.

Figure 4:
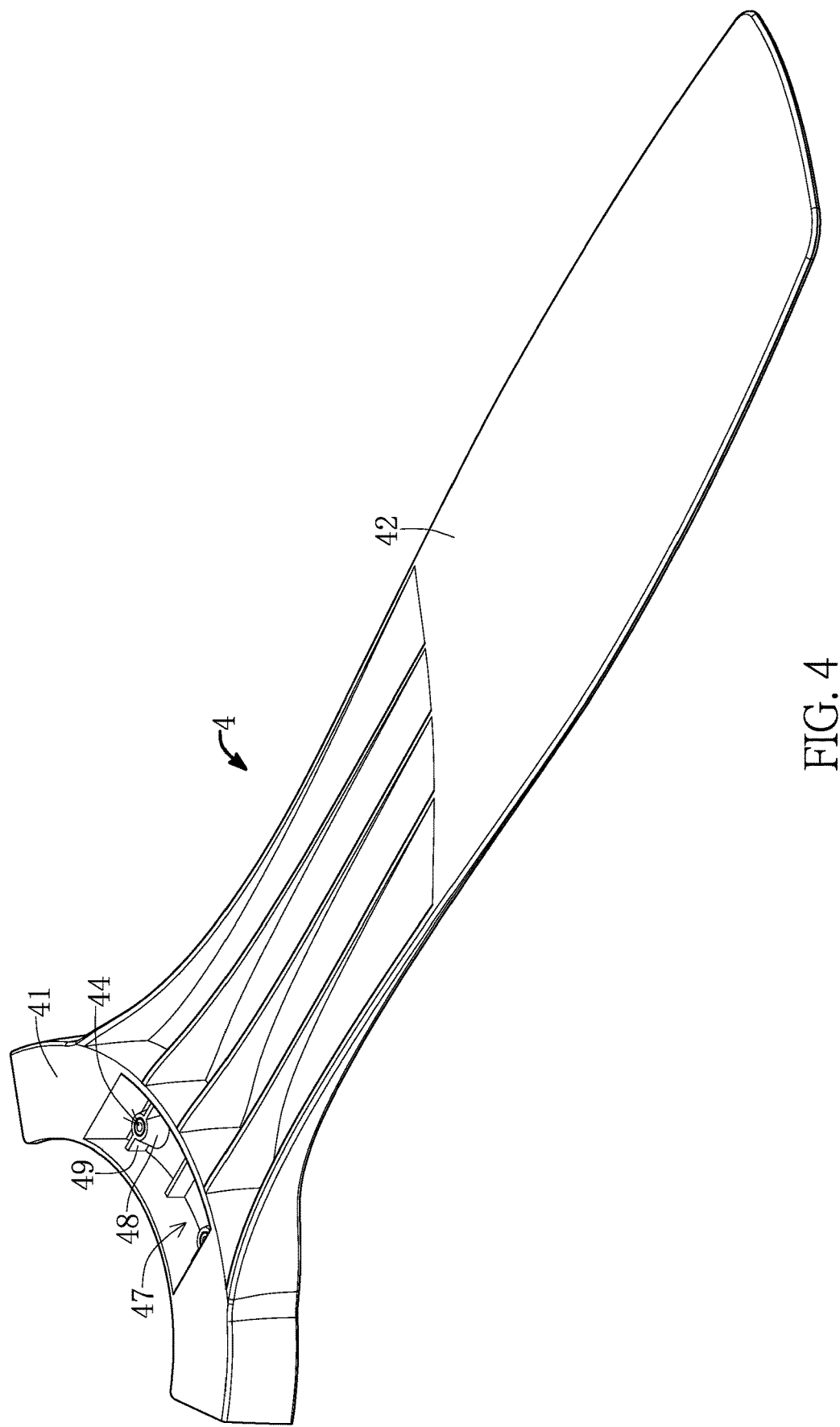
FIG. 4 is a schematic perspective view of a blade according to the present disclosure.
Figure 5:
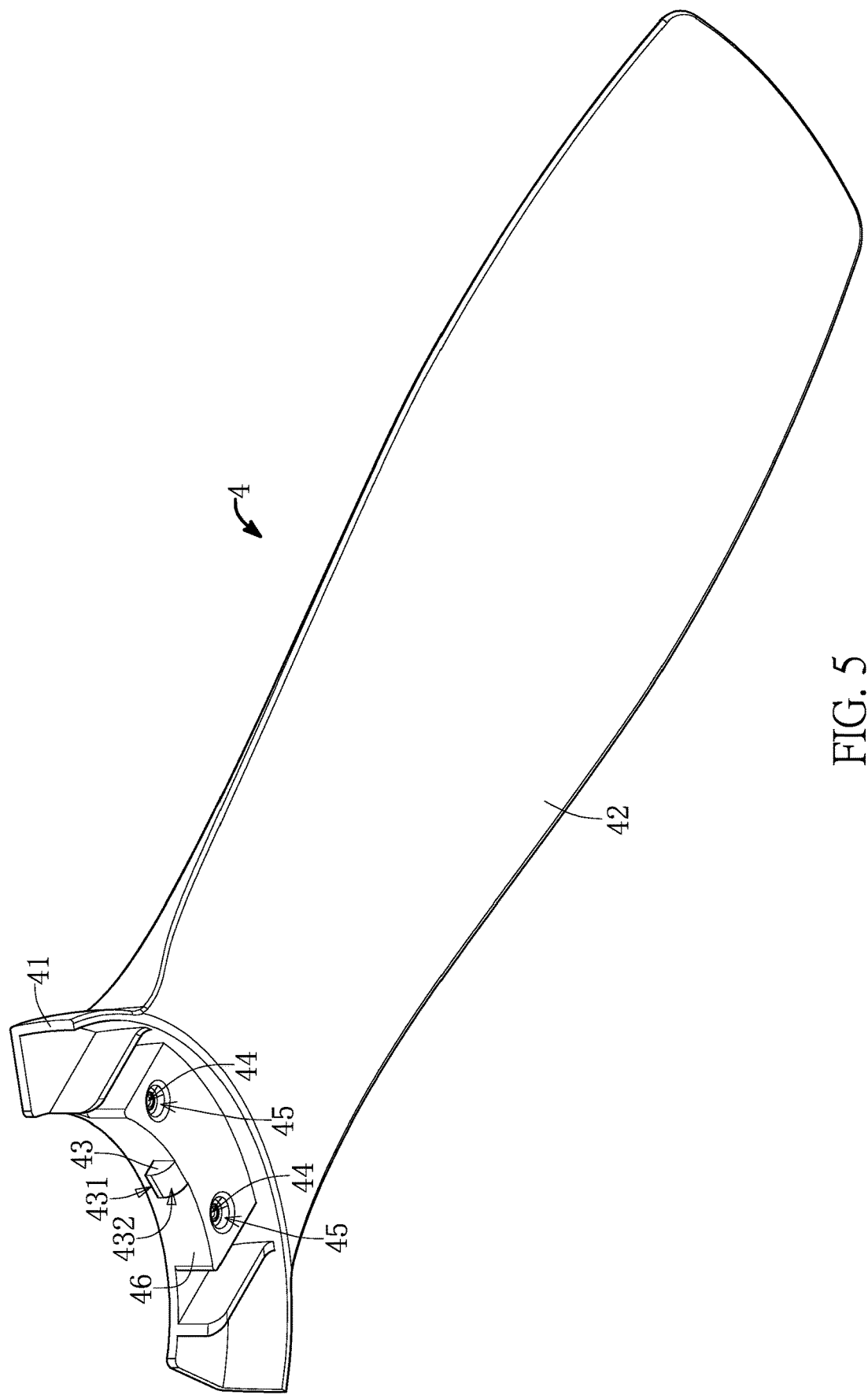
FIG. 5 is another schematic perspective view of the blade according to the present disclosure.
Figure 6:
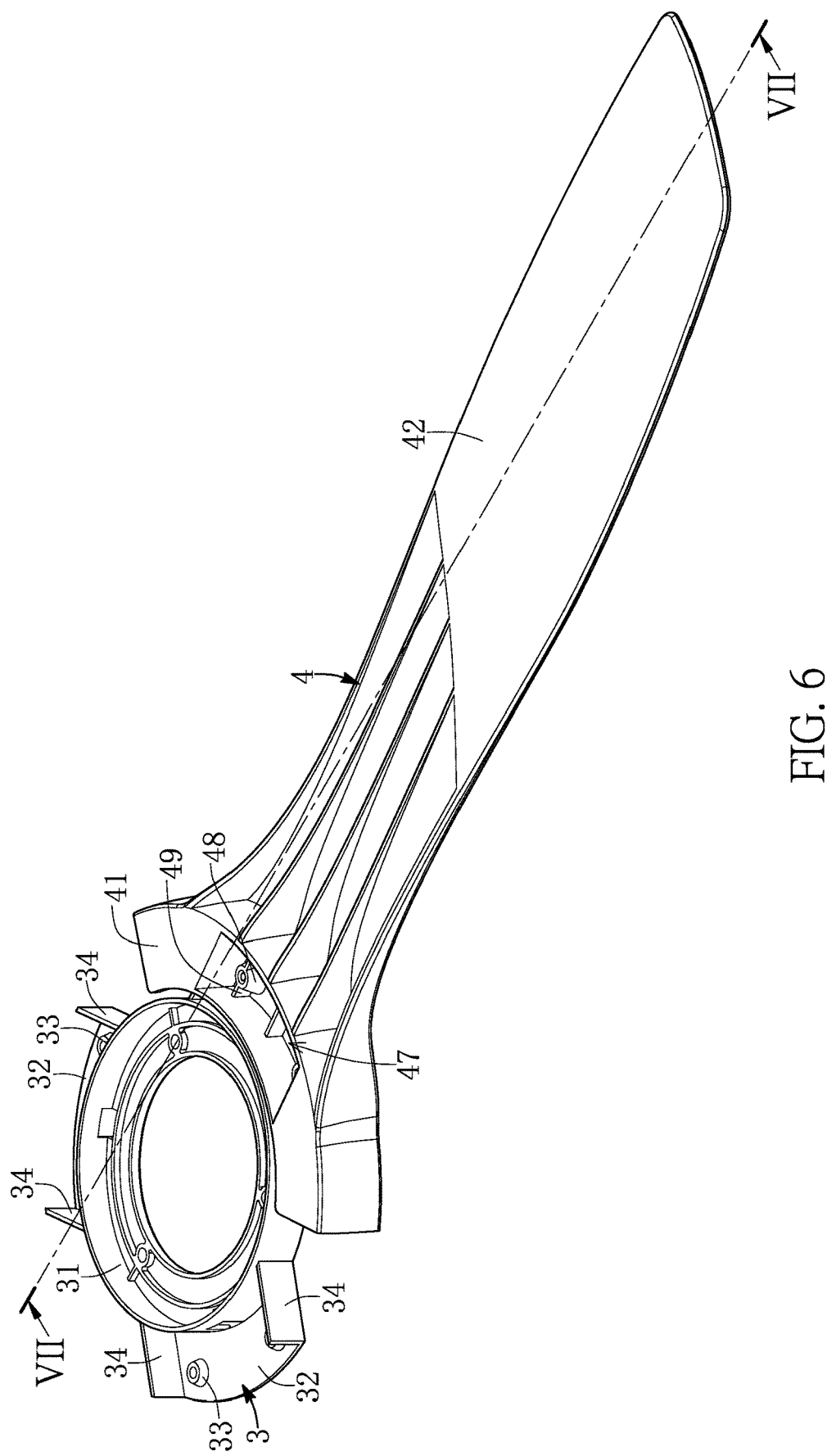
FIG. 6 is a schematic perspective view showing the blade being installed on the blade holder according to the present disclosure.
Figure 7:
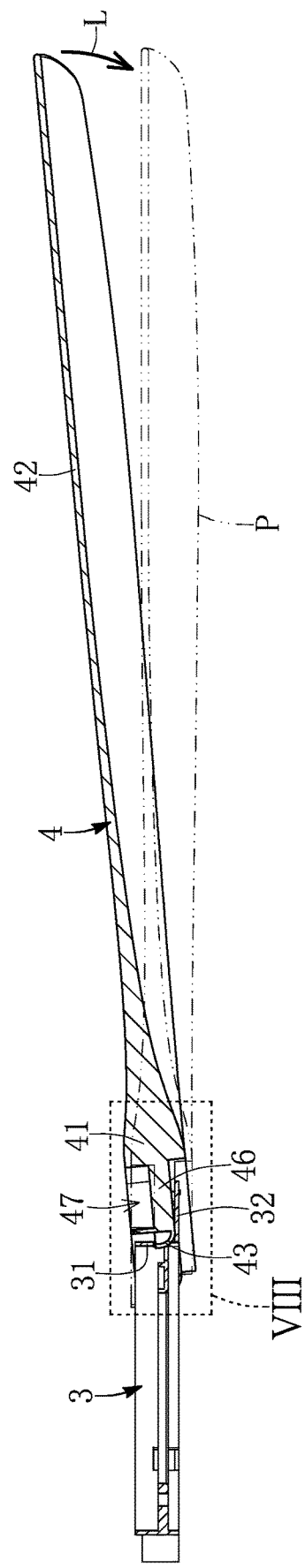
FIG. 7 is a schematic cross-sectional view taken along line VII-VII of FIG. 6.
Figure 8:
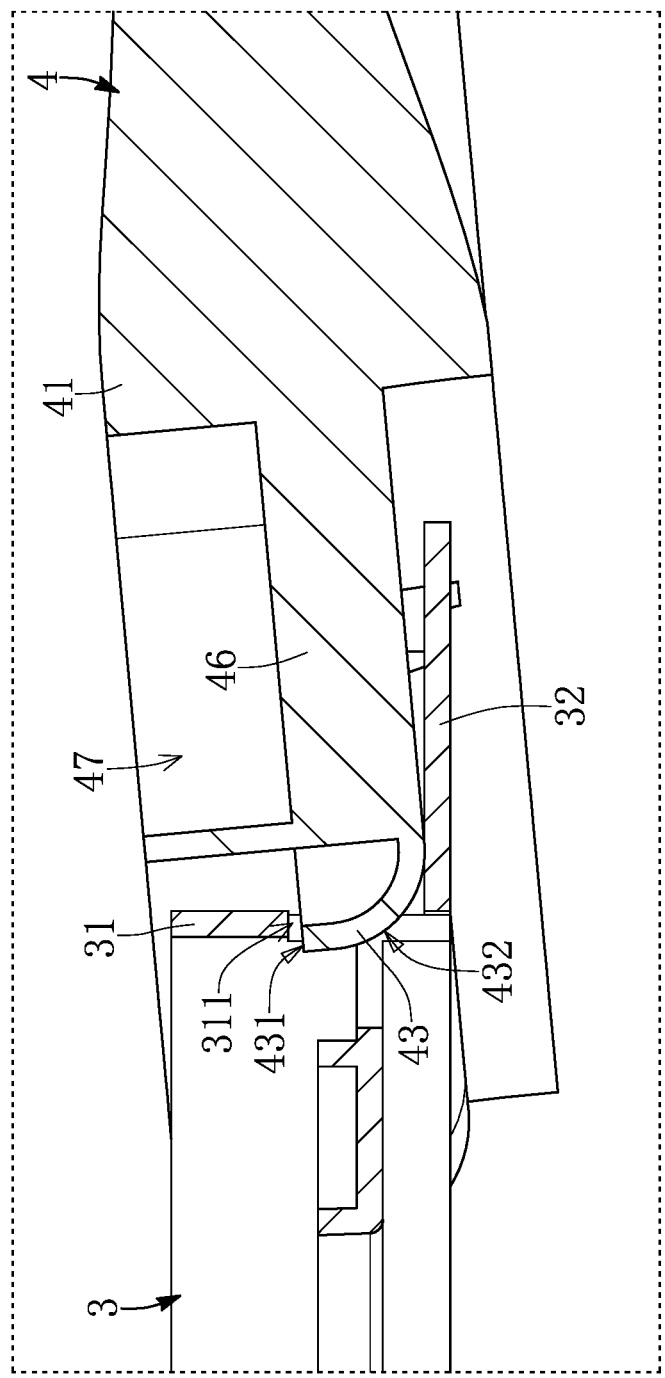
FIG. 8 is a schematic enlarged view of part VIII of FIG. 7.
Figure 9:
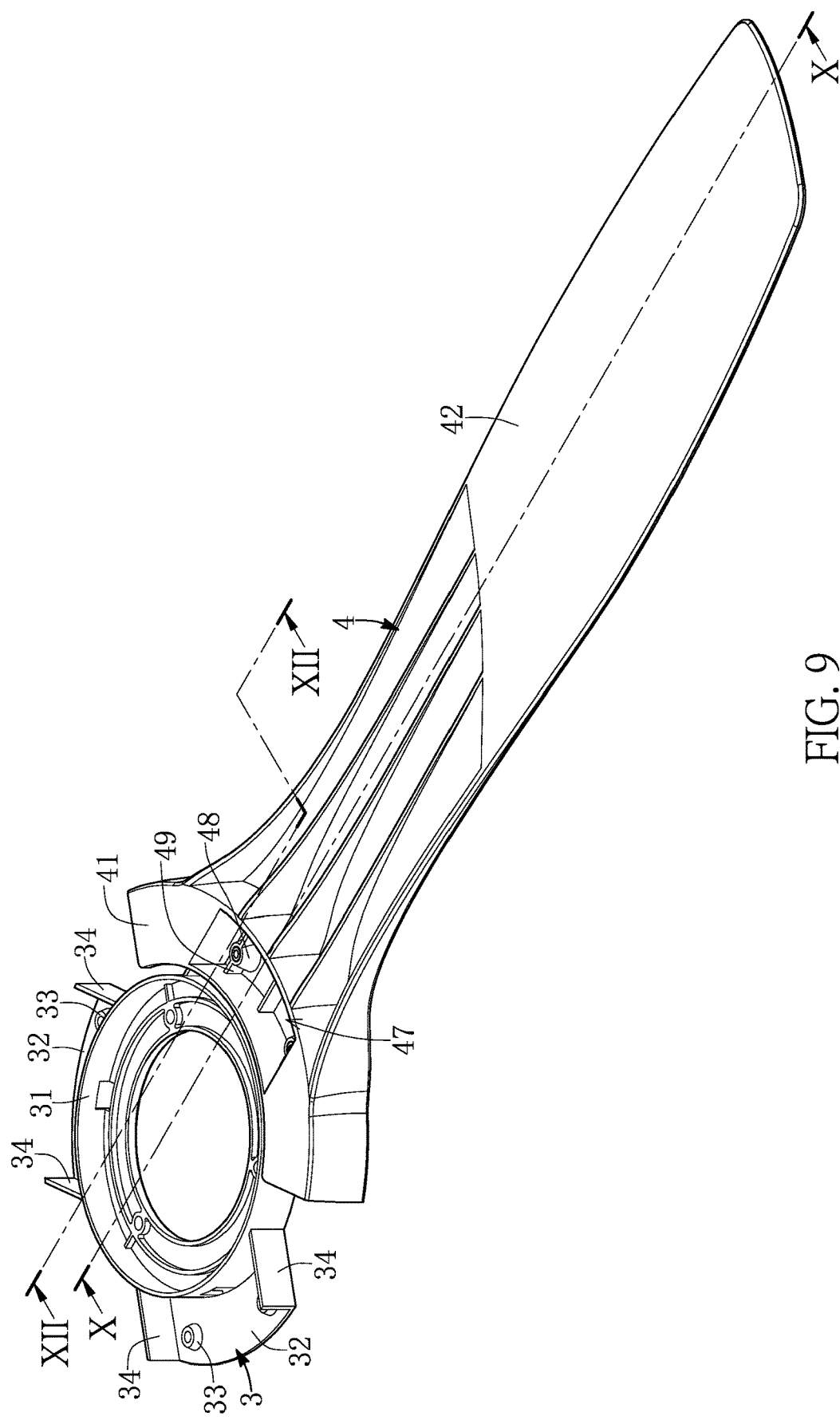
FIG. 9 is another schematic perspective view showing the blade being installed on the blade holder according to the present disclosure.
Figure 10:
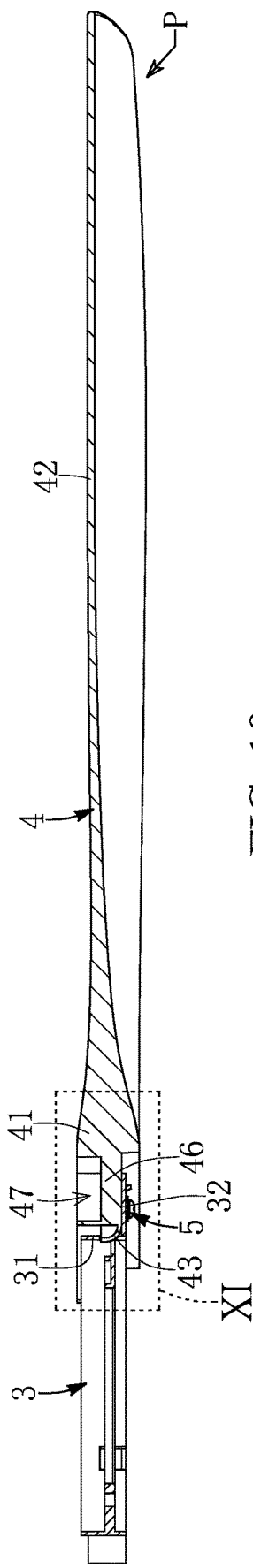
FIG. 10 is a schematic cross-sectional view taken along line X-X of FIG. 9.
Figure 11:
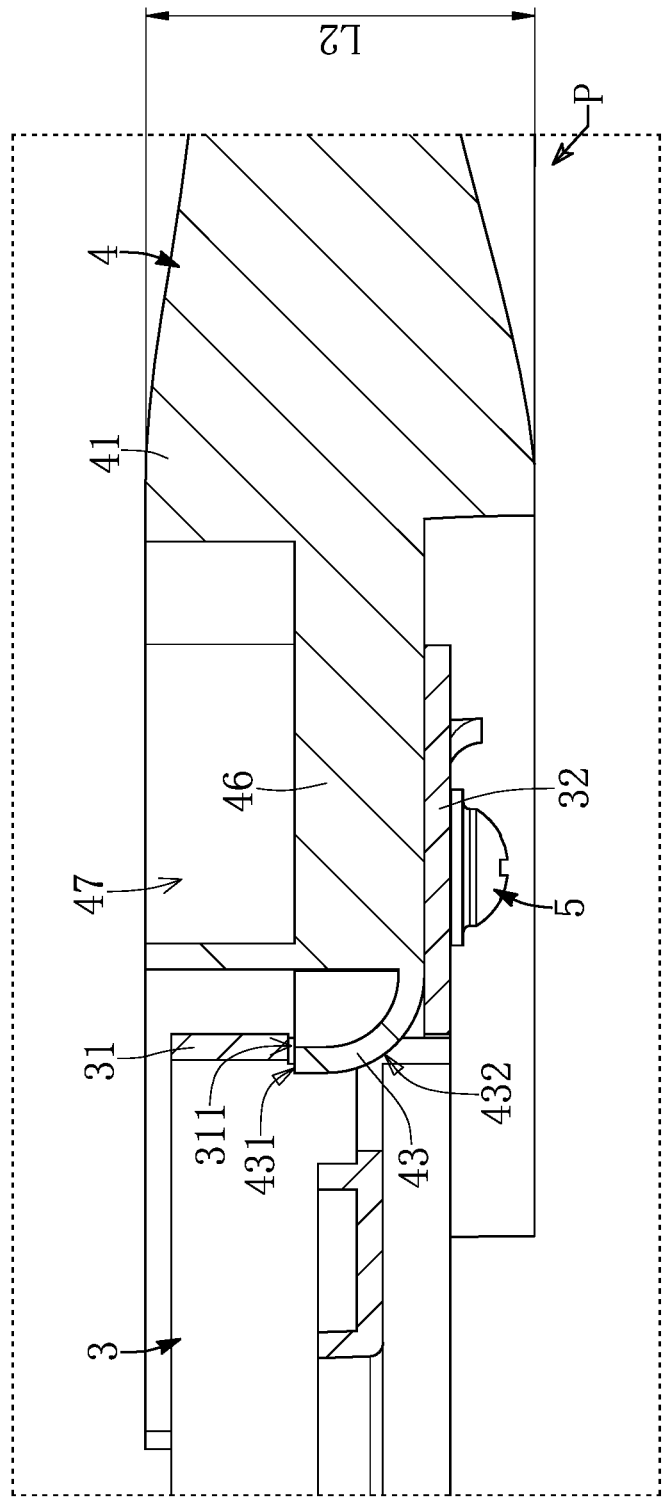
FIG. 11 is a schematic enlarged view of part XI of FIG. 10.

Referring to FIG. 4 to FIG. 6, each of the blades 4 has a second matching structure and a second positioning structure. The second matching structures of the blades 4 can respectively cooperate with the first matching structures 311, so that each of the blades 4 is disposed at an installation position P on one of the support platforms 32 along an oblique track L (as shown in FIG. 7 and FIG. 11). In addition, when each of the blades 4 is located at the installation position P, the first positioning structures 321 and the second positioning structures can abut against each other.

Specifically, each of the blades 4 includes a root portion 41 and a blade portion 42 connected to the root portion 41, and the root portion 41 of each of the blades 4 has the second matching structure and the second positioning structure. The second matching structure of each of the blades 4 in the present embodiment is a buckle block 43, the buckle block 43 is disposed on a side of the root portion 41 facing the holder body 31, and each buckle block 43 has an abutment surface 431 and a curved surface 432 connected to the abutment surface 431. During an actual assembly process, the abutment surfaces 431 of the buckle blocks 43 can respectively abut against inner edges of the buckle grooves, and the blades 4 are guided by the curved surfaces 432 of the buckle blocks 43 along the oblique track L, so as to be disposed at the installation position P on each of the support platforms 32 (as shown in FIG. 7).

Figure 12:
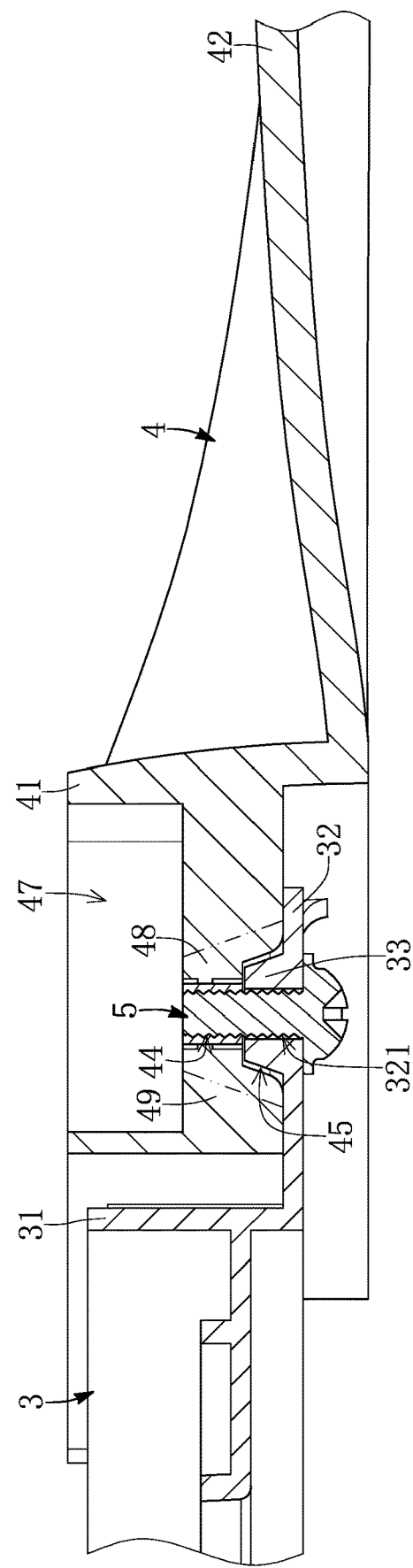
FIG. 12 is a schematic cross-sectional view taken along line XII-XII of FIG. 9.

Furthermore, in the present embodiment, the second positioning structure on each of the blades 4 is a plurality of copper nuts 44 (as shown in FIG. 12), and the copper nuts 44 are disposed on the side of the root portion 41 facing the support platforms 32. During the actual assembly process, when each of the blades 4 is guided to the installation position P by the buckle block 43, the copper nuts 44 can be aligned with the through holes on the support platforms 32.

In a practical application, in order to ensure an alignment accuracy between the copper nuts 44 and the through holes, the blade holder 3 further includes an alignment block 33 located at an outer edge of each of the through holes, and the alignment block 33 tapers away from the support platforms 32. In addition, a side surface of each of the blades 4 facing the support platforms 32 further includes a concave groove 45 surrounding one of the copper nuts 44. Accordingly, when the blades 4 are located at the installation position P, inner edges of the concave grooves 45 are respectively geometrically matched with outer edges of the alignment blocks 33.

In order to ensure that each of the blades 4 can be naturally disposed at the installation position P on each of the support platforms 32 along the oblique track L, a limit block 46 is disposed on one side of (the root portion 41 of) each of the blades 4 facing the support platforms 32, the blade holder 3 further includes two limit ribs 34 on two sides of each of the support platforms 32, and the two limit ribs 34 extend from the support platform 32 toward (the root portion 41 of) each of the blades 4. Accordingly, when the blades 4 move along the oblique track L, two side surfaces of the limit block 46 of each of the blades 4 can be abutted against by the two limit ribs 34 on one of the support platforms 32, so that each of the blades 4 is successfully positioned at the installation position P.

Preferably, as shown in FIG. 3 and FIG. 11, a height L1 of each of the limit ribs 34 relative to the support platforms 32 may be greater than or equal to 30% of a thickness L2 of the root portion 41 of each of the blades 4, and an angle variation of each of the blades 4 moving to the installation position P along the oblique track L is less than 45 degrees. In this way, a required fabrication space for quickly assembling the blades 4 can be reduced.

Referring to FIG. 2 and FIG. 12, each of the positioning elements 5 are disposed on one of the first positioning structures 321 and one of the second positioning structures that correspond in position to each other, so that the blades 4 are respectively fixed onto the support platforms 32. During the actual assembly process, the positioning elements 5 can respectively and sequentially pass through the through holes and the copper nuts 44. In other words, the positioning elements 5 are locked from the bottom to the top as shown in FIG. 2.

It is also worth mentioning that, as shown in FIG. 4 and FIG. 12, in order to ensure a structural strength of each of the positioning elements 5 that is disposed in the through hole and the copper nut 44, each of the blades 4 has an accommodating groove 47 on a side surface away from the support platforms 32, and each of the blades 4 has a plurality of reinforcing blocks 48 in the accommodating groove 47. The reinforcing blocks 48 respectively correspond in position to the copper nuts 44, and the copper nuts 44 respectively pass through the reinforcing blocks 48, so as to strengthen a structural strength of each of the copper nuts 44.

Preferably, each of the blades 4 further has a plurality of reinforcing ribs 49 in the accommodating groove 47, the reinforcing ribs 49 respectively extend from outer edges of the reinforcing blocks 48, and the reinforcing ribs 49 can be arranged along a length extending direction of one of the blades 4, so as to support each of the reinforcing blocks 48.

Naturally, it should be noted that, in another embodiment of the present disclosure (not shown in the figures), the first matching structure 311 and the second matching structure are interchangeable, and the first positioning structure 321 and the second positioning structure are also interchangeable. In other words, each of the first matching structures 311 can be the buckle block 43, the second matching structure on each of the blades 4 can be the buckle groove, the first positioning structure 321 on each of the support platforms 32 can be the copper nuts 44, and the second positioning structure on each of the blades 4 can be the through holes. During the actual assembly process, the positioning elements 5 can respectively and sequentially pass through the through holes and the copper nuts 44. In other words, the positioning elements 5 are locked from the top to the bottom.

Beneficial Effects of the Embodiment

In conclusion, in the ceiling fan and the structure thereof provided by the present disclosure, by virtue of "the second matching structures of the blades being configured to respectively cooperate with the first matching structures, so that each of the blades is disposed at an installation position on one of the support platforms along an oblique track" and "the first positioning structures and the second positioning structures abutting against each other when each of the blades is located at the installation position," the ceiling fan and the structure can achieve an effect of quick assembly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A ceiling fan, comprising:
   a seat configured to be set on a ceiling;
   a motor disposed on the seat;
   a blade holder connected to the motor, wherein the blade holder includes:
      a holder body having a plurality of first matching structures spaced apart from each other; and
      a plurality of support platforms connected to the holder body, wherein the support platforms respectively correspond in position to the first matching structures, and each of the support platforms includes a first positioning structure;
   a plurality of blades, wherein each of the blades has a second matching structure and a second positioning structure; wherein the second matching structures of the blades are configured to respectively cooperate with the first matching structures, so that each of the blades is disposed at an installation position on one of the support platforms along an oblique track; wherein, when each of the blades is located at the installation position, the first positioning structures and the second positioning structures abut against each other; and
   a plurality of positioning elements, wherein each of the positioning elements is disposed on one of the first positioning structures and one of the second positioning structures that correspond in position to each other;
   wherein each of the first matching structures is a buckle groove, the second matching structures on the blades are each a buckle block, and each of the buckle blocks has an abutment surface and a curved surface connected to the abutment surface; wherein the abutment surface of each of the buckle blocks is configured to abut against an inner edge of the buckle groove, so that the blades are guided by the curved surfaces of the buckle blocks to be disposed at the installation position on each of the support platforms along the oblique track.

2. The ceiling fan according to claim 1, wherein the first positioning structure on each of the support platforms is a through hole, and the second positioning structure on each of the blades is a plurality of copper nuts; wherein the positioning elements respectively and sequentially pass through the through holes and the copper nuts, so that the blades are respectively fixed onto the support platforms.

3. The ceiling fan according to claim 2, wherein a side surface of each of the blades away from the supporting platforms has an accommodating groove, each of the blades has a plurality of reinforcing blocks in the accommodating groove, the reinforcing blocks correspond in position to the copper nuts, and the copper nuts respectively pass through the reinforcing blocks.

4. The ceiling fan according to claim 3, wherein each of the blades in the accommodating groove has a plurality of reinforcing ribs, the reinforcing ribs respectively extend from outer edges of the reinforcing blocks, and the reinforcing ribs are arranged along a length extending direction of one of the blades.

5. The ceiling fan according to claim 2, wherein the blade holder further includes a plurality of alignment blocks located at outer edges of the through holes, the alignment block is tapered away from the support platforms, and a side surface of each of the blades facing the support platforms further has a concave groove surrounding one of the copper nuts; wherein, when the blades are located at the installation position, inner edges of the concave grooves are respectively and geometrically matched with outer edges of the alignment blocks.

6. The ceiling fan according to claim 1, wherein a limit block is disposed on one side of each of the blades facing the support platforms, the blade holder further includes two limit ribs on two sides of each of the support platforms, the two limit ribs extend from a corresponding one of the support platforms toward one of the blades, and the two limit ribs abut against two sides of the limit block.

7. The ceiling fan according to claim 1, wherein the first positioning structure on each of the support platforms is a plurality of copper nuts, and the second positioning structure on each of the blades is a plurality of through holes; wherein the positioning elements respectively and sequentially pass through the through holes and the copper nuts, so that the blades are respectively fixed onto the support platforms.

8. A structure of a ceiling fan, comprising:
a blade holder, wherein the blade holder includes:
    a holder body having a plurality of first matching structures spaced apart from each other; and
    a plurality of support platforms connected to the holder body, wherein the support platforms respectively correspond in position to the first matching structures, and each of the support platforms includes a first positioning structure;
a plurality of blades, wherein each of the blades has a second matching structure and a second positioning structure; wherein the second matching structures of the blades are configured to be respectively guided by the first matching structures, so that each of the blades is disposed at an installation position on one of the support platforms along an oblique track; wherein, when each of the blades is located at the installation position, the first positioning structures and the second positioning structures abut against each other; and
a plurality of positioning elements, wherein each of the positioning elements is disposed on one of the first positioning structures and one of the second positioning structures that correspond in position to each other;
wherein each of the first matching structures is a buckle groove, the second matching structures on the blades are each a buckle block, and each of the buckle blocks has an abutment surface and a curved surface connected to the abutment surface; wherein the abutment surface of each of the buckle blocks is configured to abut against an inner edge of the buckle groove, so that the blades are guided by the curved surfaces of the buckle blocks to be disposed at the installation position on each of the support platforms along the oblique track.

* * * * *